(12) United States Patent
Ericsson

(10) Patent No.: US 6,223,047 B1
(45) Date of Patent: Apr. 24, 2001

(54) EXTENDED SLEEP MODE METHOD AND APPARATUS

(75) Inventor: Ted Ericsson, Lomma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/140,469

(22) Filed: Aug. 26, 1998

(51) Int. Cl.[7] .................. H04B 7/00; H04B 7/20
(52) U.S. Cl. .............. 455/517; 455/343; 455/38.3; 455/574; 455/127
(58) Field of Search .................. 455/38.3, 127, 455/343, 574, 551, 517; 340/825.44

(56) References Cited

U.S. PATENT DOCUMENTS

| | | |
|---|---|---|
| 3,694,755 | 9/1972 | Ward . |
| 4,370,753 | 1/1983 | Ehmke . |
| 4,449,248 | 5/1984 | Leslie et al. . |
| 4,518,947 | 5/1985 | Poston et al. . |
| 4,613,990 | 9/1986 | Halpern . |
| 4,631,496 | 12/1986 | Borras et al. . |
| 4,654,867 | 3/1987 | Labedz et al. . |
| 4,777,655 | * 10/1988 | Numata et al. ............... 455/76 |
| 4,903,335 | 2/1990 | Shimizu . |
| 4,905,234 | 2/1990 | Childress et al. . |
| 4,961,073 | 10/1990 | Drapac et al. . |
| 4,996,526 | 2/1991 | DeLuca . |
| 5,025,251 | 6/1991 | Mittel et al. . |
| 5,027,428 | 6/1991 | Ishiguro et al. . |
| 5,039,984 | 8/1991 | Andros et al. . |
| 5,058,203 | 10/1991 | Inagami . |
| 5,072,449 | 12/1991 | Enns et al. . |
| 5,091,942 | 2/1992 | Dent . |
| 5,103,192 | 4/1992 | Sekine et al. . |
| 5,109,530 | 4/1992 | Stengel . |
| 5,123,014 | 6/1992 | Federkins et al. . |
| 5,128,938 | 7/1992 | Borras . |
| 5,129,095 | 7/1992 | Davis et al. . |

(List continued on next page.)

FOREIGN PATENT DOCUMENTS

| | | |
|---|---|---|
| 0 408 086 | 1/1991 | (EP) . |
| 0 473 465 | 3/1992 | (EP) . |
| 0 627 836 | 12/1994 | (EP) . |
| 0 642 234 | 3/1995 | (EP) . |
| 0 656 693 A2 | 6/1995 | (EP) . |
| 0 695 101 | 1/1996 | (EP) . |
| 2 115 195 | 9/1983 | (GB) . |
| 2 253 972 | 9/1992 | (GB) . |
| 62-23266 | 1/1987 | (JP) . |
| WO89/05009 | 1/1989 | (WO) . |
| WO93/23964 | 11/1993 | (WO) . |
| WO94/08420 | 4/1994 | (WO) . |
| WO94/19879 | 9/1994 | (WO) . |
| WO95/21507 | 8/1995 | (WO) . |

OTHER PUBLICATIONS

Michel Mouly et al., "The GSM System For Mobile Communications," Radio Resource Management, FR., Lassay--les--Chateaux, Europe Media, 1993, pp. 424–429.

Primary Examiner—William G. Trost
Assistant Examiner—Marceau Milord
(74) Attorney, Agent, or Firm—Burns, Doane, Swecker & Mathis, L.L.P.

(57) ABSTRACT

A power saving standby mode reduces the consumption of power in a radiocommunication system in which a base station transmits a message comprising repeated data words. Upon receiving a first word of the message, the power supplied to at least a receiver unit in the mobile phone is powered down. Decoding, CRC checking and MIN comparison of the received message are performed after the receiver unit has powered down. The early power down procedure reduces the consumption of power in the mobile phone.

24 Claims, 5 Drawing Sheets

U.S. PATENT DOCUMENTS

| | | |
|---|---|---|
| 5,140,698 | 8/1992 | Toko . |
| 5,144,296 | 9/1992 | DeLuca et al. . |
| 5,175,870 | 12/1992 | Mabey et al. . |
| 5,175,874 | 12/1992 | Auchter . |
| 5,179,724 | 1/1993 | Lindoff . |
| 5,224,152 | 6/1993 | Harte . |
| 5,251,325 | 10/1993 | Davis et al. . |
| 5,265,270 | 11/1993 | Stengel et al. . |
| 5,276,907 | 1/1994 | Meidan . |
| 5,299,228 * | 3/1994 | Hall .......................................... 375/1 |
| 5,301,225 | 4/1994 | Suzuki et al. . |
| 5,345,500 | 9/1994 | Breeden et al. . |
| 5,355,518 | 10/1994 | Kindinger et al. . |
| 5,369,681 | 11/1994 | Boudreau et al. . |
| 5,369,798 | 11/1994 | Lee . |
| 5,376,975 | 12/1994 | Romero et al. . |
| 5,406,613 | 4/1995 | Peponides et al. . |
| 5,440,560 | 8/1995 | Rypinski . |
| 5,448,762 | 9/1995 | Ward . |
| 5,459,457 | 10/1995 | Sharpe . |
| 5,471,655 | 11/1995 | Kivari . |
| 5,539,748 | 7/1996 | Raith . |
| 5,542,116 | 7/1996 | Schellinger . |
| 5,548,250 | 8/1996 | Fang . |
| 5,568,513 | 10/1996 | Croft et al. .......................... 375/224 |
| 5,590,396 | 12/1996 | Henry . |
| 5,604,744 | 2/1997 | Andersson et al. . |
| 5,613,235 | 3/1997 | Kivari et al. . |
| 5,666,355 | 9/1997 | Huah et al. . |
| 5,701,329 | 12/1997 | Croft et al. . |

* cited by examiner

EXTENDED SLEEP MODE METHOD AND APPARATUS

BACKGROUND

1. Field of the Invention

This invention relates to a method of and apparatus for reducing power consumption of portable radio communication systems, such as mobile telephones, in standby mode to increase the time between necessary battery charges and recharges.

2. Discussion of Related Art

Cellular mobile telephone systems comprise a network of base stations, each covering a particular geographical area or cell, that communicate with a plurality of mobile or hand-portable phones (hereinafter "mobile phones"). When a mobile phone is neither originating nor receiving a call it is in a "standby mode." Although essentially inactive in the standby mode, the mobile phone must listen to the nearest base station to determine if it is being called.

In the American Mobile Phone System (AMPS) EIA-553 cellular standard, the base stations transmit 40-bit word structures to the mobile phones in the standby mode. The word bit structures (or simply "words" or "control words") identify a called mobile phone by including its telephone number, also known as the Mobile Identification Number (MIN), in the message. Each word bit structure also contains a Cyclic Redundancy Check (CRC) code, the value of which depends on the data bits in the word bit structure. This CRC code can be used to verify the correct decoding and to correct single bit errors in the word bit structure. As illustrated in FIG. 1, each 40-bit work bit structure consists of 28 data bits and 12 CRC bits (e.g., Bose-Chaudhuri-Hocquenghem code bits, or commonly known as BCH code bits).

A message word structure (or simply "message") used for transmitting the above-described word bit structure is shown in FIG. 2. By way of overview, the message word structure includes preamble bit-blocks labeled "D" and "S." After the preamble, the above-described word bit structure is repeated a plurality of times. That is, the message word structure conveys five repeats A1, A2, ... A5 of a first 40-bit word "A" and five repeats B1, B2 ... B5 of a second 40-bit word "B." The A and B words belong to independent messages intended for mobile phones having odd and even MINs, respectively.

FIG. 3 shows the beginning portion of the message word structure of FIG. 2 in greater detail. The "dotting sequence" D is a 10-bit block of alternating 1's and 0's intended to provide the receiver with symbol resynchronization opportunities. Symbols are transmitted using Manchester code, in which a "1" is represented by a signal upswing followed by a signal downswing and a "0" is reproduced by a downswing followed by an upswing. In the EIA-553 cellular standard, the bit rate is 10 kb/s. The alternating 1's and 0's after Manchester coding then appear as a 5 KHz tone. The Manchester coded bits are transmitted using frequency modulation of a radio carrier. Preceding the 10-bit dotting sequence is a single bit busy/idle flag, giving the total 11 bits labeled "D" in FIGS. 2 and 3. Following the dotting sequence D is an 11-bit sync word also preceded by a busy/idle flag, making the 12 bits labeled "S" in FIGS. 2 and 3. Further, in each repeat word, four extra busy/idle bits are inserted, making 44-bit blocks, as shown in FIG. 3. The total number of bits in a calling channel cycle is thus 1+10+1+11+2×5×(40+4)=463 bits.

The MIN is 34 bits long. Thus, it takes two calling messages to uniquely identify the phone. The first 24 bits of its MIN are sent in a first cycle (e.g., a fist message word structure) and the remaining 10 bits of the MIN are sent in a second cycle (e.g., a second message word structure), as shown in FIG. 4. The first word of the multiple word message contains a flag to indicate that continuation words are to be expected. Continuation words have a continuation flag set. The continuation flag appears in either the A or B word depending on whether the mobile has an odd or even MIN. A call can in some cases consist of more than two words and so it is necessary to look at the third word to determine if it is a continuation of an already begun message, or of a new message. Other possible message types are dummy messages, or filler, which may be a single word that can be ignored, and a one- or multiple-word broadcast or "overhead" message that is to be processed by all mobile phones.

The above discussion is also relevant to the NMT standard used in Scandinavia and the ETACS standard used in the U.K., as well as other related standards not mentioned above.

In use, the above-described transmission of multiple "A" and "B" words provides redundancy against distortion in the radio channel, such as fades and impulsive noise. For instance, the mobile phone can collect the repeated messages and then use 3/5 majority voting to decode the message. This, in conjunction with the BCH processing, provides an effective level of error detection and error correction.

The above-described protocol presents a number of challenges. Notably, in the standby mode, the mobile phone must operate its receiver section to determine whether it is being called. Needless to say, this monitoring function requires energy which runs down the mobile phone's battery. This may especially present a concern in smaller mobile phones that use small batteries. Some means of conserving the battery supply is therefore desirable.

One way to reduce power consumption in the standby mode is described in European Patent No. EP 0 473 465 to Harte. Harte proposes a phone that decodes each message repeat independently as it is received, carries out a check for correct decoding using the CRC, and if correct decoding is indicated by the CRC check, checks whether the MIN of the receiving mobile phone is contained in the received word. If the MIN is not in the received word, as is the case for the vast majority of messages, then the mobile phone powers down until the next set of five message repeats is due. Thus, according to the European patent, the mobile phone can enter a reduced power mode for the remaining four message repeats whenever the first of the repeats is deemed not to contain the mobile's MIN, representing a potential savings of at least 80% of the battery energy consumed in the standby mode. Additionally, when the mobile phone has already identified from the first of the two control words of a message that the MIN does not match that of the receiving mobile phone, the mobile phone does not need to process the second word, and can power down for all five repeats of the second word. This results in a potential power savings of 90% in the standby mode.

In this technique, a mobile phone will not receive all of the five repeated words if the mobile phone determines that the first word is not addressed to the mobile phone. Accordingly, this technique is not optimally designed to make use of the majority voting of the U.S. EIA-553 standard. A mobile phone using this technique may therefore have reduced performance when confronted with fades and other degradation in the radio channel.

U.S. Pat. No. 5,568,513 to Croft et al. ("the '513 patent") improves upon the Harte technique. The '513 patent is hereby incorporated by reference in its entirety. The '513 patent discloses a technique in which, upon detection of a message, the mobile phone resets a number of accumulators corresponding to the number of data bits and check bits in a word of the message. Upon receiving a first of the repeated words, the mobile phone adds the values of each bit to a corresponding one of the accumulators. The accumulator contents are then processed to determine if values corresponding to the data bits in the accumulators are consistent with values corresponding to the check bits. A check or no-check indication is generated in accordance with this check bit processing. If the no-check indication is generated, another repeat of the word is received and its bit values are added to corresponding accumulators. The technique repeats the above-described processing until all word repeats have been accumulated or until the check signal is generated.

Upon generation of a check indication, the technique powers down parts of the mobile phone for the remainder of the repeats of the word and then further processes the accumulator values to determine if part of the word matches a corresponding part of the portable station's identification number. A match or no-match indication is generated on the basis of the processing. Upon generation of a no-match indication, the technique holds parts of the mobile phone powered down for the duration of transmission of the rest of the words in the same message. In this manner, the '513 patent receives the benefits of reduced power consumption, yet does not sacrifice the also important feature of majority voting to reduce the effects of fades.

While the above-described techniques have several advantages, there remains room for improvement in this field to further reduce the consumption of power of a mobile phone in the standby mode. In particular, it would be desirable to further reduce the time during which the receiver of the portable phone is active.

SUMMARY

These and other objectives of the present invention are achieved by immediately reducing the power of a receiver unit of the mobile phone after receiving a first repeated block of information. The decoding, CRC checking and MIN comparison are performed while the mobile phone's receiver is powered down.

More specifically, the invention comprises a technique for reducing standby power consumption in a radio communication system, wherein the radiocommunication system has at least one base station serving one or more mobile phones, wherein the at least one base station transmits a message comprising repeated blocks of information bits, each block including a number of check bits having values dependent on the data bits in the block. The technique comprises the steps of: (a) receiving a first block of information within the message in a mobile phone from the at least one base station; (b) decoding the first block of information to produce decoded data; (c) and error checking the decoded data to generate a check indication when the data bits in the decoded first block of information are consistent with the check bits, and generating a no-check indication when the data bits in the decoded first block of information are inconsistent with the check bits. According to a particularly advantageous feature, there is also a step of reducing power applied to at least a receiver of the mobile phone after the step of receiving, but before the step of decoding and the step of error checking.

BRIEF DESCRIPTION OF THE DRAWINGS

The present invention will now be described with reference to the following drawing figures, in which.

DETAILED DESCRIPTION

Figure 1:
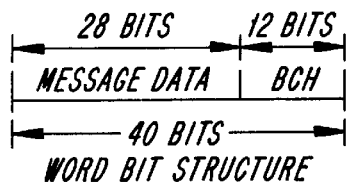
FIG. 1 shows the bit structure of a control word according to a known standard.
Figure 2:
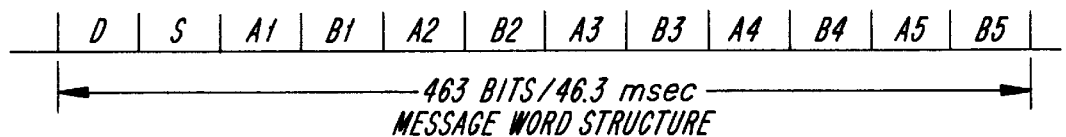
FIG. 2 shows the structure of a transmit cycle according to a known standard.
Figure 3:
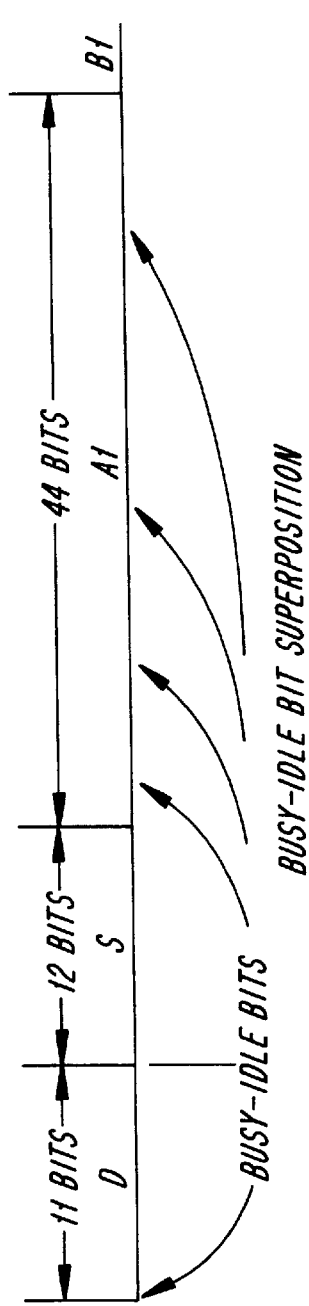
FIG. 3 shows the preamble bit-block D and S shown in FIG. 2.
Figure 4:
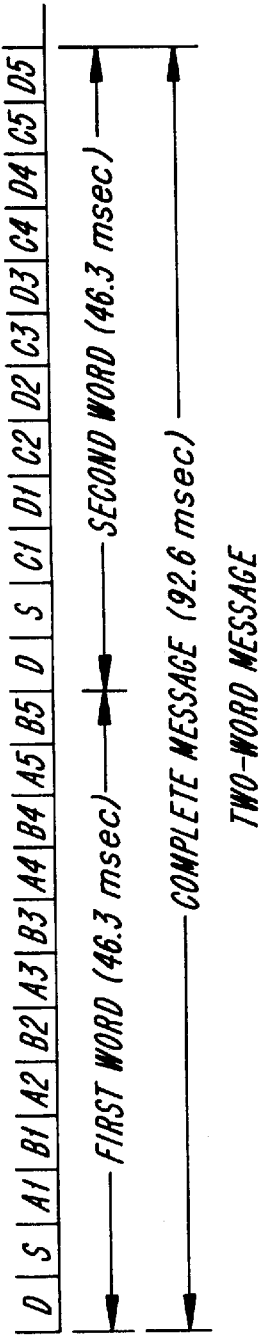
FIG. 4 shows the structure of two words containing the Mobile Identification Number (MIN) according to a known standard.
Figure 5:
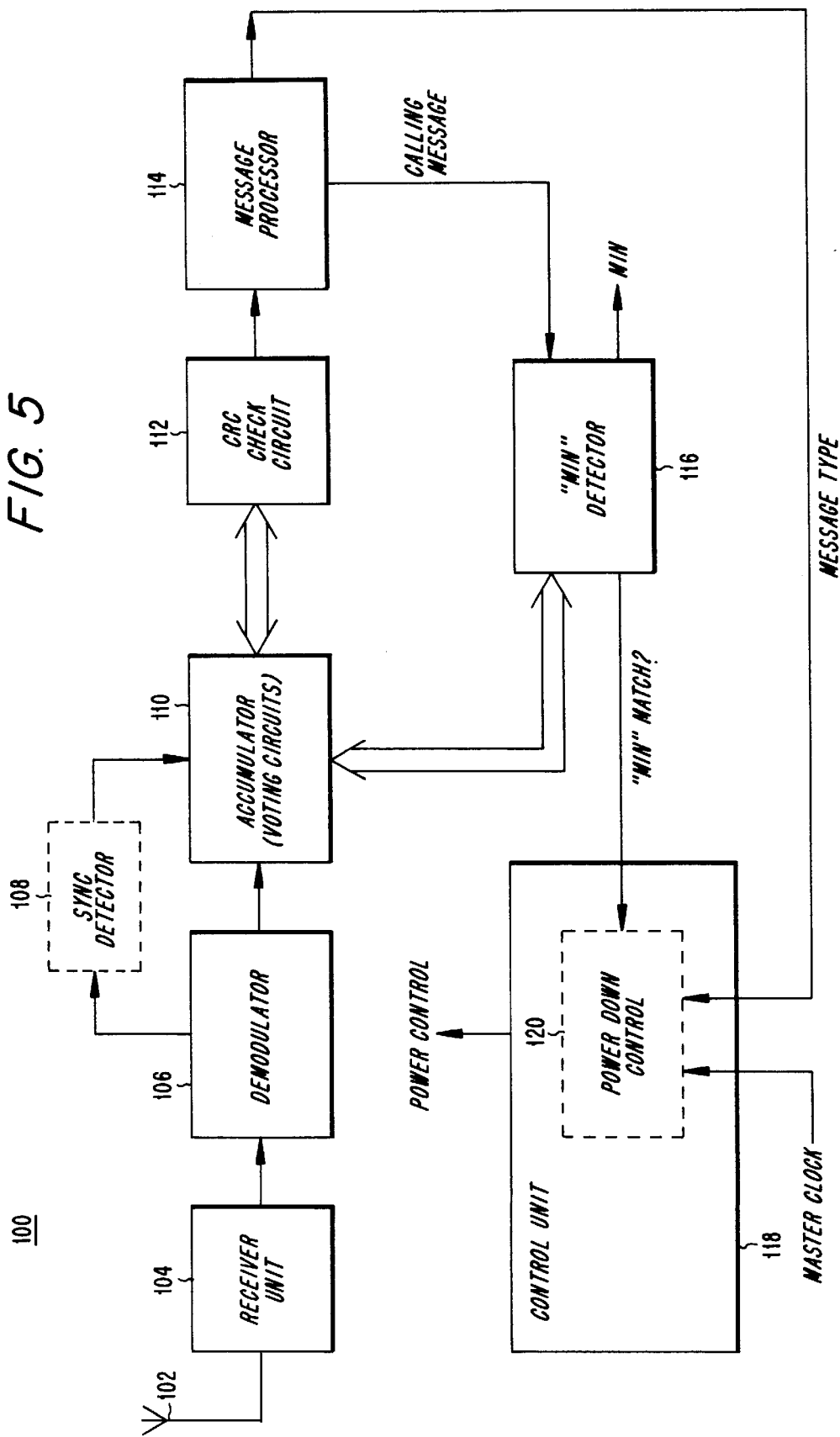
FIG. 5 is a block diagram of a mobile phone receiver in accordance with an exemplary embodiment of the present invention.

FIG. 5 is a block diagram of an exemplary mobile phone receiver according to the present invention for receiving and decoding messages transmitted in accordance with the formats shown in FIGS. 1–4. However, the present invention has application beyond the specific protocol discussed above. Further, use of the phrase "reducing power" (or the equivalent) in this discussion encompasses completely turning off the power as well as simply lowering the power level.

The receiver 100 shown in FIG. 5 generally includes an antenna 102, a receiver unit 104, demodulator 106, sync detector 108, accumulator 110, CRC check circuit 112, message processor 114, "MIN" detector 116 and control unit 118. The control unit 118 includes a module 120 for reducing the power supplied to other components in the receiver. The control unit 118 controls the other modules in the receiver through various connections, which have not been shown so as not to unnecessarily complicate the discussion.

The above-identified processing units, with the exception of at least the receiving unit 104, can be implemented by a microprocessor controlled by software, by discrete logic circuitry, or by some combination of the two. The gain associated with microprocessor computations is small compared to the power required by the receiver unit 104. Thus, a principal goal is to reduce at least the amount of time that the receiver unit 104 is operating.

The mobile phone's receiver unit 104 receives, amplifies and filters signals transmitted from a base station and then downconverts the signals to a suitable frequency for processing. The demodulator 106, such as the Manchester code modem described in the '513 patent, processes these signals to determine transmitted bit polarities, and then passes the processed bits to the sync detector 108 and the accumulator 110.

In the present case, the sync detector 108 is shown in broken lines to indicate that it is not always needed. That is, most AMPS phones are able to maintain sync with the forward control channels while sleeping. The phone can therefore wake up to repeat 1 of the applicable word without the preceding dotting and sync.

The accumulator (cumulative majority voting circuits) 110 provides cumulative majority vote decoding for each of the 40 bits in a received control message. Accordingly, accumulator 110 includes an accumulator for each bit of a control word, making 40 accumulators in total. Accumulator 110 is shown as optionally receiving a reset signal from sync detector 108 when the sync detector detects a dotting sequence D followed by a sync word S. In response, the 40 individual accumulators in the accumulator 110 are reset to zero. Generally, the accumulator 110 is reset upon receipt of a first word of a control message.

Majority voting is normally defined for only odd numbers of repeats (3, 5, or more repeats) but it will be understood that the disclosed technique can advantageously perform majority voting over even numbers of repeats also. Majority vote decoding over even numbers of repeats uses soft majority voting rather than hard majority voting in one embodiment of the invention.

In hard majority voting, a data bit is represented by a number value of 1 or −1 corresponding to the Boolean values "0" and "1." Separate estimates of the repeated data bit may then be combined by numerical addition. For example, if a first estimate of a bit is +1, a second estimate is +1 and a third estimate is −1, their sum is 1+1−1=+1 to indicate that the majority vote result is +1. However, when combining an even number in a hard bit decision, an indeterminate value of 0 (e.g., 1+1−1−1=0) can occur. Nevertheless, hard majority voting can in principle still be employed for decoding even numbers of repeats; one would just have to arbitrarily assign one or the other bit polarity in cases where the outcome is indeterminate.

In soft majority voting, on the other hand, a bit is not just represented by the values 1 or −1 (for Boolean 0 and 1), but by a continuous measure reflecting the confidence of the bit's polarity. For example, 0.9 represents a "0" with a high confidence, while 0.1 represents a "0" with a low confidence, whereas −1.25 represents a "1" with a very high confidence while −0.05 represents a "1" with a very low confidence. By adding in the confidence values of the corresponding bits, a net or cumulative confidence value representing the polarity of the bit is obtained, this value being valid for even numbers of repeats as well as odd numbers of repeats. The chance of exactly 0 resulting from adding soft bit values is small, so that an arbitrary treatment of 0 as always being a positive number (or alternatively a negative number) has no significant impact on the resulting error rates. Soft majority voting is therefore the preferred technique for implementing the present invention, although hard majority voting can be employed with somewhat less favorable results.

The CRC check circuit 112 is activated by the control unit 118 to process the contents of the majority vote circuits to decide if they contain a 40-bit, error-free word. More specifically, the processing by CRC check circuit 112 temporarily hard-quantizes the soft bit values in the accumulators to either −1 or +1 (Boolean 1 or 0) and then calculates a syndrome, which is the remainder upon polynomial division of the word by a CRC polynomial according to the known art. A syndrome of all zeros signifies an error-free word. Forty non-zero syndrome values correspond to one of the possible predetermined single-bit error patterns, and all other syndrome values correspond to more than a single-bit error. By checking a non-zero syndrome with each of the 40 possible syndromes that would result in a single-bit error in one of the 28 data bits or 12 CRC bit positions, it can be determined if such a single-bit error has occurred and where it is located. It may then be corrected by inverting the bit in question. Alternatively, any other non-zero syndrome can be taken to mean that the data bits cannot be relied upon.

The CRC check circuit 112 indicates whether there are uncorrected errors in the received message. In the event that there are no uncorrected errors, the CRC check circuit 112 also activates a message processor 114 to check if the type of message is a calling message, a broadcast message or a dummy (filler) message. If the message processor 114 determines that the message is a calling message, it activates the MIN detector 116. The MIN detector 116 determines if the word contains at least part of the MIN of the receiving phone. If the received MIN bits do not match corresponding bits of the MIN of the receiving phone, the MIN 116 detector generates a "not MIN" indication.

The power down unit 120 receives at least both the indication of the message type and the output of the MIN detector 116. The power down module 120 then determines whether certain parts of the receiver 100 should be shut down, and for how long. For example, if the MIN of a calling message does not match the MIN of the phone, the power supplied to the receiver 104 and associated circuitry (e.g., the accumulator 110, CRC check circuit 112, etc.) can be reduced for the remainder of the message.

Further, according to one particularly advantageous aspect of the invention, the power down control module 120 reduces the power supplied to at least the receiver unit 104 immediately after the initial word of the transmitted information is received. Other modules of the receiver (e.g., the demodulator 106, accumulator 110, CRC check circuit 112, MIN detector 116, etc.) remain operational. However, since these latter-mentioned modules are preferably implemented by software, they consume less power than the receiver unit 104. Hence, their continued operation is not a significant factor in the depletion of the battery.

If the initial word is determined to contain uncorrected errors, the receiver 104 is turned back on to receive another word starting at the first possible repeat of the control word. Ideally this would be the second repeat of the control word, but may be a later repeat, e.g., the third, because of potential receiver limitations. The power to the receiver unit 104 is then immediately shut off.

Once received, the 40-bit values obtained from the second word are added into the majority vote circuits. Thus, the majority vote circuit 110 at the end of the second repeat contains the sums of the corresponding bit values of the first and second word repeats (which, as described, need not be consecutive repeats, e.g., need not be the control words A1 and A2). When the soft bit values are used as described above, the resulting 40 values represent the 40-bit word with a higher confidence of correctness than either repeat alone. If hard bit values are accumulated instead, the resulting values do not necessarily have a higher probability of giving a correct word, but at least have an independent chance of being correct. Thus, the cumulative probability of a word being detected error free after both the first and the second repeats is higher than the probability of detecting it on the first repeat alone.

The accumulated contents of the accumulator 110 are then sent to the CRC check circuit 112 for processing. If it is determined that the message contains no uncorrected errors, then the control word is processed in the manner described above. For instance, if it is determined that the message is a calling type of message, the message is forward to the MIN detector 116 for MIN comparison (to determine whether the mobile phone has been called).

If the second CRC check does not indicate an error free message, the third message repeat is received and cumulatively added in the majority vote circuits 110 and so on until either the CRC checks at some stage, or all five message repeats have been exhausted.

In summary, one advantage of the present invention is that the power of at least the receiver unit 104 is immediately turned off following the receipt of a word. In contrast, the '513 patent turns off the power only after an error-free word is indicated by the CRC check circuit. The Harte technique turns off the power only after a MIN comparison has been performed. Accordingly, the present invention offers the potential of providing a more efficient use of power.

Figure 6A:
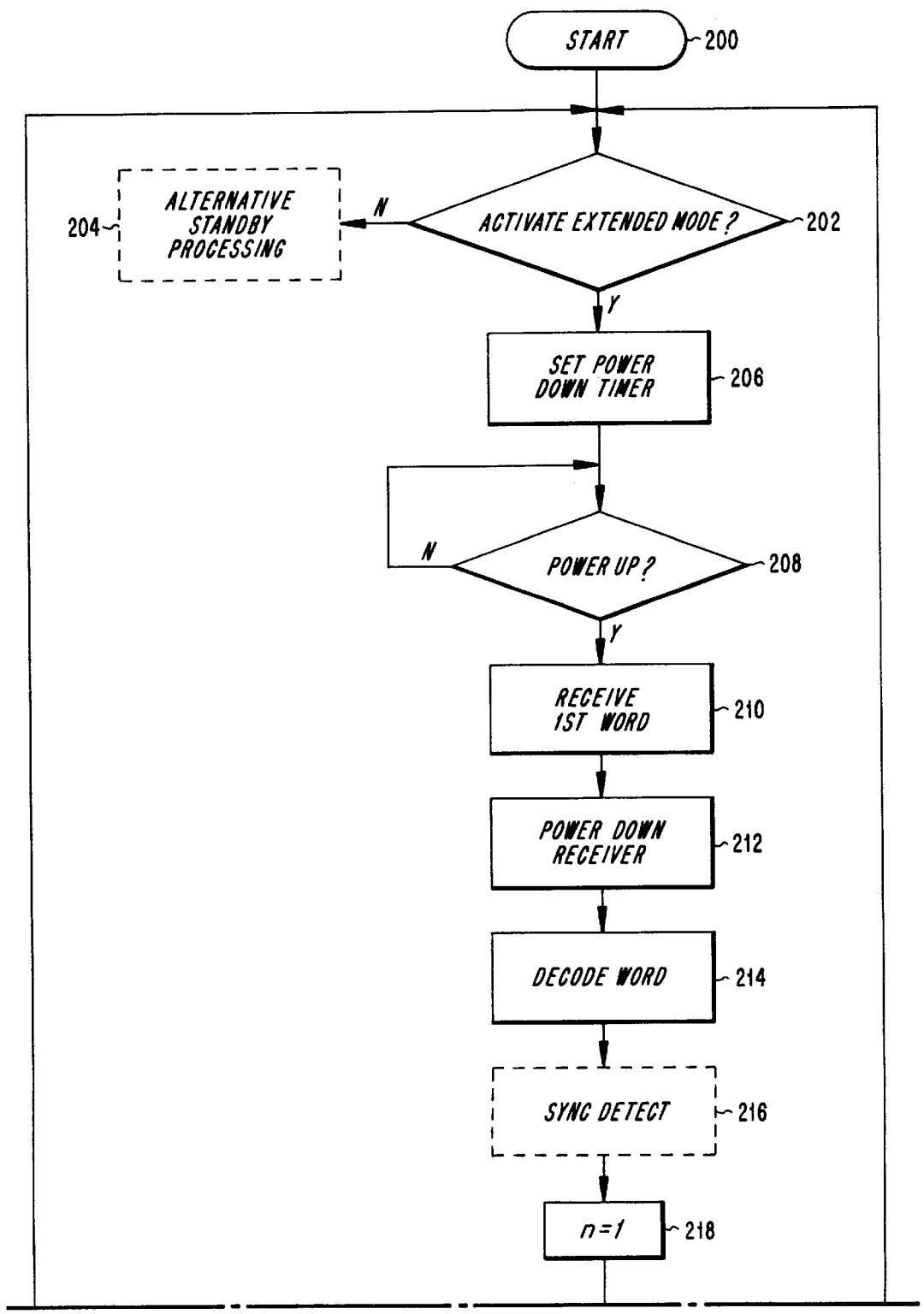
FIGS. 6A and 6B show a flow chart in accordance with exemplary aspects of the present invention.
Figure 6B:
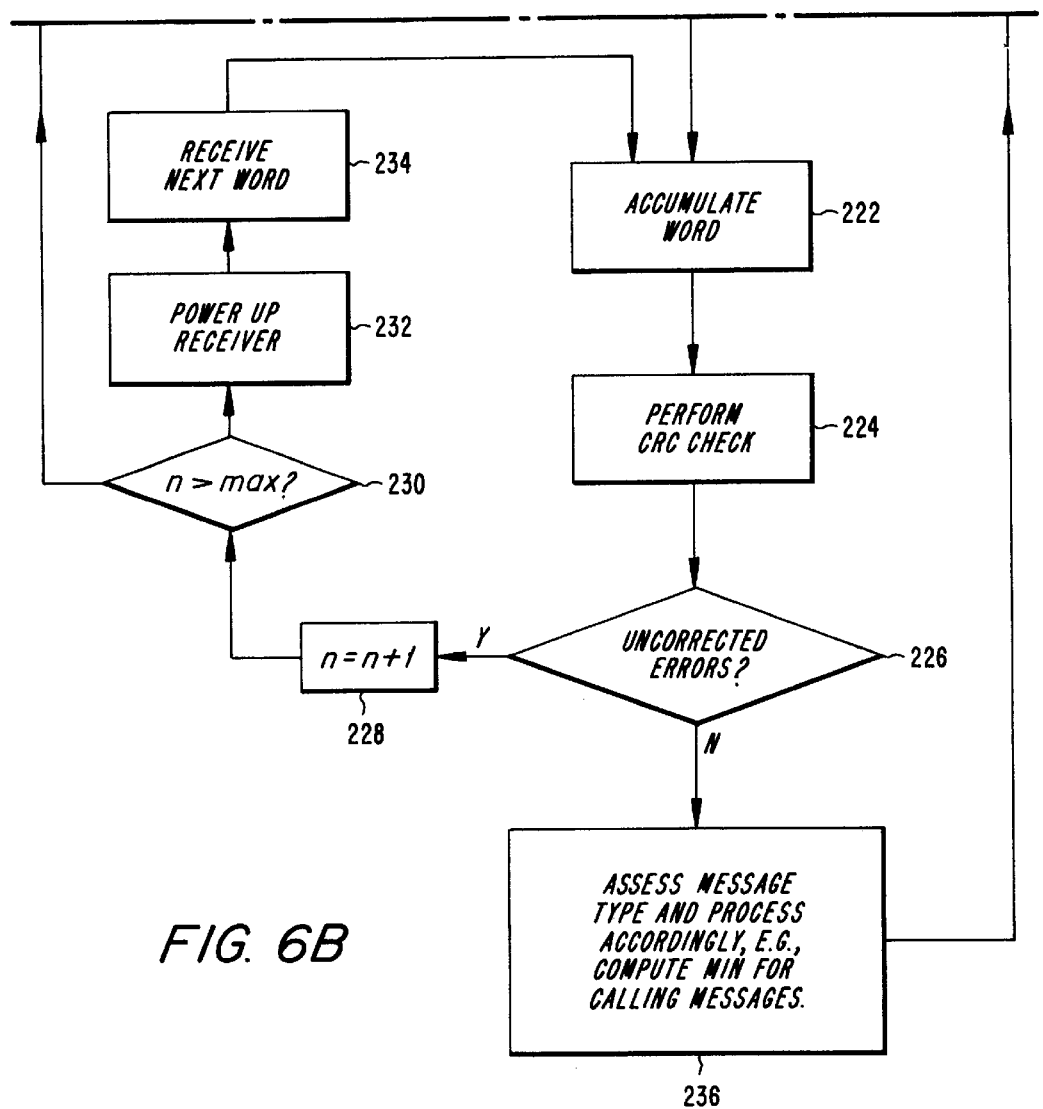

FIGS. 6A and 6B illustrate the extended sleep mode technique of the present invention in flowchart form. These control functions can be implemented by a suitably programmed microprocessor. For instance, the control unit 118 can include a ROM (not shown) which stores the necessary code to carry out the functions described as follows.

The process starts in step 200 when the mobile phone first enters a standby mode, e.g., upon switch-on of the mobile phone or termination of a previous call. In step 202 the mobile phone determines whether the special extended mode discussed above (in which power is reduced immediately after receipt of a word) is to be employed. If the special extend mode is not activated, alternative standby processing modes are activated, as indicated in step 204. These alternative standby modes can encompass a first standby mode in which no sleep mode processing is performed. In this mode, each of the five repeats are received and processed by the mobile phone. A second standby mode can use the technique described by Harte. A third standby mode can use the technique described in the '513 patent.

Generally, use of sleep modes may make it more difficult to receive an error free message, since the mobile phone is only intermittently synchronized. Also, when operating in a sleep mode, the mobile phone bases its decoding decisions on less data compared to the non-sleep mode of operation of the mobile phone. For this reason, it may be desirable to switch from sleep mode to a conventional (non-sleep) mode when the quality of a radiocommunication channel is poor. For instance, the quality of the radio channel may become poor near cell boundaries, or when there is an inordinate amount of interference in the cell.

The quality of the radiocommunication channel can be assessed in a number of ways. The mobile phone can use various signal strength measures to determine the quality of the radiocommunication channel, such as an RSSI measure or some signal-to-interference ratio. Also, the mobile phone can assess a statistical measure of errors received in previous messages, and use this statistical measure as a guide in determining the quality of a radiocommunication channel. For instance, the confidence information stored in the accumulator 110 can be used to assess the condition of a radio channel. In still other embodiments, some combination of strength-based and statistical error-based measurements can be employed.

Presuming that the special extended sleep mode is activated, processing proceeds by setting a power down time interval in step 206. This interval determines when the mobile phone should wake up and receive a control word (to determine whether it is being called). In one embodiment, the wake up interval can be selected such that the mobile phone wakes up to receive a first word of a message, including the dotting and synchronization codes, as in the '513 patent. In an alternative embodiment, the wake up interval can be set such that the mobile phone wakes up to receive just the first word of the message. This latter embodiment can be employed in those cases where the mobile phones are able to maintain a high degree of synchronization when sleeping.

In step 208 the mobile phone determines whether the set sleep interval has transpired or not. If not, the mobile phone remains in the sleep mode. If the interval is over, the algorithm advances to step 210, in which a first word of the message is received. The first word is determined by taking account of whether the mobile phone's MIN is odd or even (e.g., by skipping over a block of data, as necessary). As mentioned, the mobile phone can receive just the control word, or may also receive the synchronization preamble.

In any event, immediately upon receiving the first word, at least the receiver unit 104 is powered down. The remainder of the processing in the mobile phone is preferably performed by a suitably programmed microprocessor, which requires little power compared to the discrete components of the receiver, such as the receiver unit 104. The data in the first word is then decoded in step 214 while no power is applied to the receiver unit 104.

If synchronization is employed, the decoding also involves a synchronization step 216. More specifically, a central timer is set to power up the receiver in a certain window to search for dotting D and sync S words. The window begins at a fixed time before the next sync is expected and ends a fixed time afterward, for example, ± one symbol.

Upon decoding the first word (as indicated by setting n=1 in step 218), the counters of the accumulator 110 are reset to zero. The algorithm then stores the first word in the accumulator 110 in step 220.

In the next step (224), a CRC check is performed based on the contents of the accumulator 110. If the CRC check indicates the presence of uncorrected errors (as determined in step 226), then processing advances to step 228, in which the algorithm seeks to read another word (as designated by n=n+1). However, if a maximum number of words have already by read (as determined in step 230), then the accumulation routine is aborted and the processing returns to steps 202 and 206. If all repeats have not been accumulated and there are uncorrected errors after the CRC check, the process powers up the receiver unit 104 to detect a next word in step 232. The next word is then detected in step 234. The next word (n=n+1) is determined by skipping the next set of bits (which belong to the different type of message). Also, as stated above, because of limitations of the receiver, the next word may not be the next consecutive word of in a particular message. For instance, if the first word is A1, then the next word may be A3, A4 or A5.

The bits from the next word are accumulated in step 224. The CRC check is then recomputed on the basis of the updated contents of the accumulator 110. If the CRC check still indicates the presence of uncorrected errors, the above described procedure is repeated, in which another "next" word is read.

In the case of a CRC check indicating an error-free word prior to or after processing all five repeats, the processing advances to step 236. Generally, in this step the nature (i.e., type) of the message is checked to determine for how long the power down timer shall operate. The types of messages are:

1) A one-word call,

2) A multiple-word call,

3) A one-word filler,

4) A one-word broadcast/overhead message, or

5) A multiple-word broadcast.

Two bits of the message are used to distinguish between single-word messages, the first word of a multiple-word message and a continuation word of a multiple-word message. After testing the message type, the mobile phone either ignores the rest of the transmit cycle by powering down till the next syncs are due, or ignores the rest of the cycle and the whole of the next cycle, or quits the standby mode because a one- or two-word call has been detected to contain the phone's MIN bits.

Specifically, if the message is a single word filler, the routine returns to step 206 (via step 202) to set the power down timer. If the message is a single word broadcast overhead message, the word is stored and processed and thereafter the subroutine returns to step 206.

If the message is determined to be a single word call, then the flags are cleared and the first 24 bits are checked for match with the mobile phone's MIN. If there is a match, then the mobile phone leaves the stand-by mode. If the 24 bits do not match, then the routine returns to step 206.

Other details of the processing performed for different types of messages are disclosed in the '513 patent, which is incorporated here by reference.

In conclusion, note that the power down step is performed relatively early in the present invention, e.g., at step 212 of FIG. 6A. In marked contrast, the '513 patent discloses one embodiment in which the power down step is performed after step 226 shown in FIG. 6B. The present invention thus offers the potential of providing a more efficient use of the mobile phone's battery.

The exact point in time at which the receiver unit 104 is powered down need not be as particularly specified in FIGS. 6A and 6B. In one embodiment, however, it is preferred that the receiver unit 104 is at least powered down before decoding, CRC checking, and MIN comparison. Other modules of the receiver 100 can likewise be immediately powered down.

Although the above invention has been described in connection with cellular telephones, it is not intended to be so limited. The power conserving arrangement and method of this invention can be used advantageously with beepers, pagers, and any other system having mobile or fixed stations which are self-identifiable upon receipt of transmitted messages. The invention finds general applicability in systems in which the base station transmits redundant messages, and the mobile phone performs a series of processing steps in different stages. In this general embodiment, the receiver unit is powered down immediately after receiving a first message.

Further modifications and improvements which retain the basic underlying principles disclosed and claimed herein are within the scope and spirit of the present invention.

What is claimed is:

1. A method for reducing standby power consumption in a radio communication system, wherein said radiocommunication system has at least one base station serving one or more mobile stations, wherein said at least one base station transmits a message comprising repeated blocks of information bits, each block including a number of check bits having values dependent on data bits in said block:

receiving a first block of information within said message in a mobile station from said at least one base station;

decoding said first block of information to produce decoded data;

error checking said decoded data to generate a check indication when said data bits in said decoded first block of information are consistent with said check bits, and generating a no-check indication when said data bits in said decoded first block of information are inconsistent with said check bits; and reducing power applied to at least a receiver of said mobile station after said step of receiving, but before said step of decoding and said step of error checking.

2. The method in accordance with claim 1, further comprising the steps of:

determining, upon generation of said check indication, what type of message said data bits represent; and detecting whether said data bits convey said mobile station's identification number, when said message is determined to be a call message, to generate a match signal when the data bits match the mobile station's identification number, and to generate a no-match signal when the data bits do not match the mobile station's identification number.

3. The method in accordance with claim 2, further comprising, upon generation of a no-match signal, the step of:

reducing the power applied to selected parts of said mobile station for a predetermined period of time.

4. A method in accordance with claim 1, further comprising, upon generation of a no-check indication, the steps of:

reapplying power to said receiver;

receiving another block of information within said message;

reducing power to said receiver;

decoding said other block of information;

accumulating said other block of information with said first block of information in an accumulator, to produce an accumulation output; and error checking said accumulated output to generate a check indication or no-check indication based on said accumulation output.

5. A method in accordance with claim 4, further comprising the steps of receiving, decoding, accumulating and error checking additional repeated blocks, so long as a no-check indication is generated in each error checking step, and so long as a maximum member of received additional blocks is not exceeded.

6. A method in accordance with claim 4, wherein said accumulation step accumulates values of said information bits by soft majority voting.

7. A method in accordance with claim 4, wherein said accumulating step accumulates values of said information bits by hard majority voting.

8. A method in accordance with claim 4, wherein said accumulation step includes resetting accumulators upon receipt of a first of repeated blocks of information bits.

9. A method in accordance with claim 1, wherein said error checking includes a cycle redundancy check.

10. A method in accordance with claim 1, further including a step of assessing the quality of a radiocommunication channel to produce a quality measure, wherein said step or reducing power is only performed when said quality measure satisfies a predetermined criterion.

11. A method in accordance with claim 10, wherein said quality measure is related to RSSI of a received signal.

12. A method in accordance with claim 10, wherein said quality measure is related to a statistical measure of errors encountered by said mobile station.

13. A radiocommunication system for reducing standby power consumption in mobile stations, wherein said radiocommunication system has at least one base station serving one or more of said mobile stations, wherein said at least one base station transmits a message comprising repeated blocks of information bits, each block including a number of check bits having values dependent on data bits in said block:

receiver means for receiving a first block of information within said message in a mobile station from said at least one base station;

decoding means for decoding said first block of information to produce decoded data;

error checking means for checking said decoded data to generate a check indication when said data bits in said decoded first block of information are consistent with said check bits, and generating a no-check indication when said data bits in said decoded first block of information are inconsistent with said check bits; and power controlling means for reducing power applied to at least said receiver means after said receiver means receives said first block, but before said decoder means and said error checking means process said first block.

14. A radiocommunication system in accordance with claim 13, further comprising:

means for determining, upon generation of said check indication, what type of message said data bits represent; and means for detecting whether said data bits convey said mobile station's identification number, when said message is determined to be a call message, to generate a match signal when the data bits match the mobile station's identification number, and to generate a no-match signal when the data bits do not match the mobile station's identification number.

15. A radiocommunication system in accordance with claim 14, further wherein, upon the generation of said non-match signal, said power controlling means reduces the power applied to selected parts of said mobile station for a predetermined period of time.

16. A radiocommunication system in accordance with claim 13:

wherein said power controlling means, upon generation of a no-check indication, reapplies power to said receiver means;

wherein said receiver means receives another block of information within said message, followed by said power controlling means again reducing power to said receiving means;

wherein said decoding means decodes said other block of information;

further comprising an accumulating means for accumulating said other block of information with said first block of information, to produce an accumulation output;

wherein said error checking means checks said accumulated output to generate a check indication or no-check indication based on said accumulation output.

17. A radiocommunication system in accordance with claim 16, wherein said accumulating means accumulates values of said information bits by soft majority voting.

18. A radiocommunication system in accordance with claim 16, wherein said accumulating means accumulates values of said information bits by hard majority voting.

19. A radiocommunication system in accordance with claim 16, wherein said accumulation means includes means for resetting accumulators upon receipt of a first of repeated blocks of information bits.

20. A radiocommunication system in accordance with claim 13, wherein said error checking means comprises a cycle redundancy checking mechanism.

21. A radiocommunication system in accordance with claim 13, further including a quality measuring means for assessing the quality of a radiocommunication channel to produce a quality measure, wherein said power controlling means only reduces power when said quality measure satisfies a predetermined criterion.

22. A radiocommunication system in accordance with claim 21, wherein said quality measure is related to RSSI of a received signal.

23. A radiocommunication system accordance with claim 21, wherein said quality measure is related to a statistical measure of errors encountered by said mobile station.

24. A mobile station for use in a radiocommunication system having reduced standby power consumption, wherein said radiocommunication system has at least one base station serving said mobile station, wherein said at least one base station transmits a message comprising repeated blocks of information bits, each block including a number of check bits having values dependent on data bits in said block, said mobile station comprising:

receiver means for receiving a first block of information within said message in a mobile station from said at least one base station;

decoding means for decoding said first block of information to produce decoded data;

error checking means for checking said decoded data to generate a check indication when said data bits in said decoded first block of information are consistent with said check bits, and generating a no-check indication when said data bits in said decoded first block of information are inconsistent with said check bits; and power controlling means for reducing power applied to at least said receiver means after said receiver means receives said first block, but before said decoder means and said error checking means process said first block.

* * * * *